2,777,753
Patented Jan. 15, 1957

United States Patent Office

2,777,753
SEPARATION OF COBALT FROM NICKEL

Felix A. Schaufelberger, Rye, and Alfred M. Czikk, Flushing, N. Y., assignors to American Cyanamid Company, New York, N. Y., a corporation of Maine No Drawing. Application June 15, 1956,
Serial No. 591,525

4 Claims. (Cl. 23—117)

This invention relates to hydrometallurgy of cobalt and nickel. More particularly, it is concerned with the separation of these metals one from the other when both are contained in the same liquor. Still more particularly, it involves a new method of obtaining a substantially nickel-free cobalt solution from liquors containing the mixed soluble salts of both metals.

Nickel and cobalt metals and their naturally occurring minerals are very similar to one another in both physical and chemical properties. Moreover, both metals generally occur together in their natural deposits and cannot be separated by conventional ore dressing methods. For these reasons, both metals are generally present, in varying amounts, and all solutions that result from any type of leaching of either nickel or cobalt natural or intermediate products.

In conventional metallurgy of either nickel or cobalt, the presence of relatively large quantities of the minor metal in the ores and concentrates of the major one has always been a serious and difficult problem. When small amounts of cobalt are present in nickel concentrates, most of that cobalt is discarded in the slag from nickel smelting. The remainder is sold in the nickel bullion or cathodes as nickel metal. Very little is recovered and sold as cobalt metal primarily because the cost of separation by present methods is at least as great as the additional value of the cobalt metal.

When small amounts of nickel are present in cobalt concentrates and, therefore, in the cobalt solutions, this nickel is generally either discarded at considerable cost or is recovered with the cobalt. In the latter case, the nickel becomes an impurity in the cobalt metal, and the producer is generally not paid for it. In some cases, certain nickel and cobalt mixed metals are marketable as such, but usually at a price below the value of the pure metals in separate products.

It is apparent, therefore, that a process for the efficient separation of cobalt and nickel into separate products would be very useful in both nickel and cobalt metallurgy.

Many processes have been either proposed or used for the treatment of liquors containing dissolved cobalt and nickel salts. Most of these involve oxidation of cobalt to cobaltic hydroxide, while the liquor is being partially neutralized with an alkali. Cobalt is easier to oxidize, and the resulting cobaltic salt will hydrolyze and precipitate from a slightly more acidic solution than will the parallel nickel hydroxide.

There have been also suggested several methods of separating nickel and cobalt from ammonium carbonate leach liquors. Most of these involve fractional distillation of the ammonium carbonate. The mother liquor, at different stages in the process, thereby becomes concentrated with either nickel or cobalt. This liquor may then be removed and treated separately. The residue may be redissolved and retreated separately.

The above types of processes for the production of nickel or cobalt result in products containing relatively large amounts of the other metal, respectively. This relatively poor separation is probably due to the fact that the separations are made by precipitation of hydroxide or basic carbonate solids. These solids always occlude or absorb large quantities of the solution from which they are precipitated.

More recently, there have been several new separation procedures suggested. One such procedure comprises recovering cobalt as cobaltic hexammine sulfate. The procedure comprises adjusting the solids content of the liquor to provide at least sufficient ammonia to form cobalt hexammine and at least sufficient anions to satisfy the cobalt in its trivalent state. The adjusted solution is then oxidized and heated to about 250° F. to precipitate a yellow-orange crystalline cobaltic amine salt, substantially free of nickel. This procedure provides for an excellent separation and produces a high purity cobalt product even when treating liquors having low cobalt to nickel ratios. It, however, is not particularly satisfactory for liquors having high cobalt to nickel ratios, since it involves separating the major metal constituent of the liquor in solid form. In addition, it requires high ammonium concentrations to insure formation of the hexammine as well as high temperatures and pressures.

Another recently suggested procedure for effecting a nickel-cobalt separation comprises high temperature reduction with hydrogen in which nickel in the form of nickel amine complexes is preferentially reduced with respect to cobalt. This may then be followed by reduction of the cobalt. While products of excellent purity are also obtained in this method, it also has the disadvantage that it requires high temperatures and pressures and is preferably applied to liquors having high nickel to cobalt ratios.

Still another of these new procedures comprises treating a nickel-cobalt liquor at room temperature with carbon dioxide whereby cobalt carbonate is precipitated. This provides cobalt products of satisfactory purity particularly from liquors having high cobalt to nickel ratios. Cobalt carbonate, moreover, is easily calcined and reduced to obtain a metal product. However, the problem created by the necessity for handling large volumes of carbon dioxide is a disadvantage.

More recently, there has been described an improved process of separating cobalt and nickel in which cobalt is recovered as a solution of cobaltic ammine sulfate. In general, the process comprises adjusting the ammonia content of a liquor containing dissolved cobalt and nickel sulfate to provide not substantially more ammonia than that necessary to form cobalt and nickel pentammine. The sulfate ion concentration is also adjusted to provide at least sufficient sulfate ions to satisfy cobalt in its trivalent state and nickel in its bivalent state. Adjusted liquor is then subjected to oxidation at temperatures as high as 100° C. but preferably at room temperature with a sulfur-free, oxygen-bearing oxidizing gas. The hydrogen ion concentration of the oxidized liquor is then adjusted to not less than about pH 6 but not greater than about that equivalent to about 2.0% aqueous sulfuric acid solution whereby nickel ammonium sulfate is formed.

Oxidized and adjusted liquor is then subjected to crystallization preferably involving cooling and agitation. In about one hour, precipitation of nickel ammonium sulfate is complete. Within the hydrogen ion concentration range described, cobaltic pentammine sulfate is quite unexpectedly stable and soluble while nickel pentammine sulfate is decidedly unstable and is neutralized to form nickel and ammonium sulfates which precipitate together as nickel-ammonium sulfate. Under normal concentrations of ammonium sulfate, i. e., only sufficient to provide sulfate ions for dissolved metal content, nickel may be precipitated down to about 1 gram/liter leaving a substantially nickel-free solution of cobaltic pentammine sulfate, the exact purity thereof depending upon the original cobalt to nickel ratio. By providing excessive quantities of ammonium sulfate, it is possible to further affect the solubility of the nickel-ammonium sulfate so that the nickel values may be precipitated to 0.5 gram per liter and even as low as 0.2 gram per liter of nickel in solution. This may be accomplished if necessary or desirable by the addition of ammonium sulfate at any of various stages in the process.

The process provides for excellent cobalt nickel separations regardless of the original cobalt to nickel ratio. It is most advantageously used, however, on those ores and concentrates in which cobalt is predominant, e. g. ratios of cobalt to nickel of about 4 to 1 and higher. The process requires no excessive pressures or temperatures nor does it require excessive use of expensive reagents which cannot be easily regenerated or sold as valuable by-products.

Although the above-described improved process permits for recovery of a substantial nickel-free cobalt solution in which cobalt is present as soluble cobaltic ammine sulfate, the yield of cobalt is not as high nor the cobalt to nickel ratio of the nickel precipitate as low as would be expected from the completeness of oxidation. It appears that this is probably because one of the primary products of oxidation is cobaltic ammine peroxide. Upon addition of acid, this ammine peroxide disproportions to form equal amounts of cobaltous sulfate and cobaltic pentammine sulfate. The former precipitates thereby decreasing the yield of cobalt in solution as well as increasing the cobalt to nickel ratio in the nickel product. Acidification of a solution containing cobaltic ammine peroxide not only results in partial reduction of the oxidized cobalt but also in considerable loss of sulfuric acid consumed in neutralization of liberated ammonia.

A process capable of increasing the recovery of cobalt of such a separation procedure would be highly desirable. In like manner, lower cobalt to nickel ratios in the nickel product resulting from such increase would further facilitate recovery therefrom of a nickel metal product. It is, therefore, the primary object of this invention to provide a process which satisfies these aims.

This object has been met in a most surprisingly effective manner. At the same time, moreover, the outstanding features of simplicity and economy of the above-described process have been maintained. In general, the process comprises a liquor adjustment step after oxidation but before acidification and separation of nickel as nickel ammonium sulfate. The liquor adjustment comprises heating the oxidized liquor to boiling, and boiling for sufficient time to obtain the desired results.

As used throughout the specification and claims of this application, the term "cobaltic pentammine" is intended to mean a cobaltic ammine complex sulfate which is stable and soluble at a pH less than about 4. Such a complex ion is formed by appropriate adjustment, if necessary, of the ammonia concentration of the liquor to be treated. While the ammonia to combined dissolved cobalt plus nickel mol ratio of a liquor necessary to obtain such a cobalt complex ion may vary, it will be the general practice to adjust the ratio to about 4:1–5:1. Higher ratios may also be employed provided they are not so high as to form the highly insoluble cobaltic hexammine sulfate. Ratios less than about 4:1 tend to produce cobaltic ammine sulfates which are highly unstable and insoluble under the above-described acid conditions.

While it is not the purpose of this specification to limit the invention by any theory or explanation, it is believed that heating of the liquor converts cobaltic ammine peroxide into soluble and acid stable cobaltic pentammine with accompanying release of oxygen. This conversion is quite noticeable since it is accompanied by a change of color from dark brown of the peroxide to bright red of the cobaltic pentammine.

The particular means employed for heating the liquor forms no part of this invention. Heating may be accomplished by any means or in any manner. Preferably, however, it is conducted within certain limitations so as to obtain optimum conversion to cobaltic pentammine. It has been found that slow steady heating to the boiling point of the liquir results in a substantially greater conversion to cobaltic pentammine than does very rapid heating. Accordingly, heating should be practiced so as to raise the temperature steadily, finally reaching the boiling point within a period of about 30 minutes to 1 hour and preferably within about 45 minutes to 1 hour.

It has also been found that the manner of conducting the period of boiling also influences the results obtained. For instance, extended periods of boiling, i. e., 15 to 25 minutes, greatly increase the extent of conversion as compared with shorter periods, i. e., 1 to 2 minutes. Beyond about 25 minutes, however, this increase begins to be offset by hydrolysis of the cobaltic ammines which results in precipitation of cobaltic oxide. Boiling, therefore, should not be extended to the point at which hydrolysis and precipitation occurs. As pointed out above, maximum conversion to cobaltic pentammine occurs from about 15 to 25 minutes, generally about 20 minutes, without formation and precipitation of cobaltic oxides.

The vigor with which boiling of the solution is conducted also influences the reaction. Vigorous boiling for shorter periods tends to hydrolyze the cobaltic ammines to oxide. The extent of this hydrolysis caused by vigorous boiling is, of course, further increased by the length of time it is maintained. To obtain optimum results, therefore, boiling should be gentle.

The following examples further illustrate the invention. All parts are by weight unless otherwise noted.

*Examples 1–4*

A leach liquor obtained by leaching an ore containing cobalt and nickel in a ratio of 20:1 is adjusted to an ammonia:cobalt plus nickel mol ratio of 5:1 and ammonium sulfate:cobalt plus nickel mol ratio of 1:1 and oxidized at room temperature with 50 p. s. i. g. of oxygen for 15 minutes. Oxidized liquor is divided into four equal samples. Sample 1 is not subjected to heating, but samples 2–4 are subjected to heating comprising boiling for periods of 2, 20 and 60 minutes, respectively. Each sample is then acidified to pH 1 using 50% sulfuric acid, agitated for an hour, filtered and precipitate washed. Results are found in Table I.

TABLE I

| Example | Heat Treatment | Cobalt Product Liquor Yield Percent of Charged Co | Solid Nickel Product, Co/Ni |
|---|---|---|---|
| 1 | None | 66 | 6.45. |
| 2 | 2 Min. Boil | 84 | 3.45. |
| 3 | 20 Min. Boil | 92 | 2.14. |
| 4 | 60 Min. Boil |  | Black cobaltic oxide. |

To show the effect of vigorous boiling, the following example was run.

*Example 5*

The procedure followed in Examples 1–4 was repeated except that oxidized liquor is vigorously boiled for 20 minutes. This resulted in precipitation of black cobaltic oxide indicating hydrolysis of cobaltic ammines.

The following example illustrates the effect of heating to boiling too rapidly.

*Example 6*

The procedure of Examples 1–4 is repeated except the oxidized liquor is divided into two samples the first of which is heated in 4 minutes to boiling and boiled for 10 minutes while the second is heated to boiling in 60 minutes and boiled for 10 minutes. The treatment of sample 1 results in precipitation of cobaltic oxide while no precipitate prior to acidification is obtained in the treatment of sample 2.

The above heat treatment increases recovery of cobalt. It has been found, however, that, in some cases, cobaltic pentammine sulfate and cobaltous ammonium sulfate precipitate to some extent on acidification along with nickel ammonium sulfate. This is particularly true when the concentration of cobalt is more than one mol per liter. This causes high cobalt to nickel ratios in the nickel product and, accordingly, correspondingly lower cobalt to nickel ratios in the residual liquor.

It is an additional feature of this invention to provide a process that effectively overcomes this problem. In general, it comprises subjecting the oxidized and heat treated liquor to the action of steam. It is believed that steam treatment results in a lowering of the ammonia content of the oxidized and heat treated liquor thereby increasing solubility of cobaltic pentammine sulfate. The reasons why this occurs are not known. At any rate, whatever the reason or reasons, it is a fact that by properly conducting the treatment, solubility of cobaltic pentammine sulfate can be so increased as to make substantially negligible any precipitation thereof even from the most concentrated cobalt solutions.

An additional advantage resides in the decreased consumption of acid necessary to acidify the liquor and precipitate nickel ammonium sulfate. This is due in part probably to a decrease in ammonia concentration resulting from steam stripping. Additionally, it may be due in part to conversion of any cobaltous pentammine to cobaltic pentammine, thereby eliminating neutralization and precipitation of the former as cobaltous ammonium sulfate.

Steam treatment may be conducted in accordance with the process of this invention by bubbling steam through the oxidized and boiled liquor. Alternatively, vacuum may be effectively employed to obtain steam from the liquor itself. The period required to obtain optimum results will vary to some extent with each liquor being treated. Accordingly, a general treatment period covering all cases cannot be rigidly fixed and expressed in terms of time. However, there are minimum and maximum times within which each liquor must be treated to obtain optimum results. Less than this minimum time may not obtain the desired extent of cobaltic pentammine sulfate solubility. On the other hand, extended periods of steam stripping may result in conversion to and precipitation of cobaltic oxide. It may generally be stated, then, that treatment should be such as to decrease dissolved ammonia concentration at least sufficient to increase cobalt solubility but less than sufficient to precipitate cobalt oxide.

Steam treatment may be conducted separately from the heat treatment or as a part thereof. In the latter case, steam is introduced into the liquor in a manner to slowly and steadily raise the temperature to boiling. It is then further introduced for a sufficient period of time to obtain the results and benefits of both boiling and steam stripping. Ammonia released as a result of the treatment, regardless of how practiced, may be recovered and reused in the initial adjustment step.

The process of this invention may be further illustrated by the following examples.

*Example 7*

A leach liquor containing 1¼ mols/liter of cobalt as cobalt sulfate, 1/15 mol/liter of nickel as nickel sulfate, 1¼ mols/liter of ammonium sulfate and 6¼ mols/liter of ammonia is oxidized at room temperature with 50 pounds of oxygen for 15 minutes and divided into two equal samples. Each sample is then slowly heated to boiling and gently boiled for 25 minutes. Steam is bubbled through sample 2 during the period of boiling. Both samples are cooled, acidified to a hydrogen ion concentration equivalent to a 0.6% aqueous sulfuric acid solution, agitated for one hour, filtered and precipitate washed with ammonium sulfate. The washed and dried precipitate of sample 1 contained cobaltic pentammine sulfate along with the nickel ammonium sulfate, while that of sample 2 was substantially pure nickel ammonium sulfate.

*Example 8*

A leach liquor containing 1 mol/liter of cobalt as cobalt sulfate and 1/20 mol/liter of nickel as nickel sulfate is adjusted to an ammonia concentration of 5 mols/liter of ammonia and 1 mol/liter of ammonium sulfate and oxidized for 20 minutes. Oxidized liquor is divided into 3 portions and each heated over ½ hour to boiling. Sample 1 acidified to pH 2 with 50% aqueous sulfuric acid. Samples 2 and 3 are steam boiled for additional periods of 20 and 40 minutes, respectively, and acidified to pH 2 with 50% aqueous sulfuric acid. The results are set forth in the following Table II.

TABLE II

| Sample | Steaming (Min.) | pH | $H_2SO_4$ (M./L.) | Nickel Product | Color |
|---|---|---|---|---|---|
| 1 | 0 | 2 | 0.54 | contains $Ni(NH_4)_2(SO_4)_2$ and $Co(NH_3)_5{}_2(SO_4)_3$. | bright red. |
| 2 | 20 | 2 | 0.34 | subt. pure $Ni(NH_4)_2(SO_4)_2$ | pale green. |
| 3 | 40 | 2 | 0.34 | $Co_3O_4$ formed | black. |

A comparison of samples 1 and 2 clearly indicates that proper steaming results in a nickel ammonium sulfate precipitate substantially free of cobaltic pentammine sulfate and a reduced consumption of $H_2SO_4$ during acidification. Sample 3 shows that extended steam results in precipitation of black cobaltic oxide.

This application is a continuation-in-part of copending applications Serial Nos. 400,113 and 400,114 of the applicants herein, filed December 23, 1953, both of which are now abandoned.

We claim:

1. In a hydrometallurgical process for recovering a substantially nickel-free cobalt solution from a liquor containing dissolved nickel sulfate and cobalt sulfate which comprises adjusting the solutes contents of said liquor to provide about 5 mols of ammonia for each mol of dissolved cobalt and about 5 mols of ammonia for each mol of dissolved nickel and a sulfate ion concentration at least sufficient to satisfy the dissolved cobalt content in its trivalent state and dissolved nickel in its bivalent state; oxidizing the adjusted liquor with a sulfur-free, oxygen-bearing oxidizing gas; introducing sulfuric acid into said oxidized liquor to produce a hydrogen ion concentration greater than that equivalent to a pH of about 4 whereby a substantially cobalt-free nickel-bearing precipitate is formed; and separating said precipitate leaving a substantially nickel-free cobalt-bearing liquor, the improvement in combination therewith which comprises: prior to acid addition, slowly and steadily heating said oxidized liquor to its boiling point and gently boiling said liquor.

2. A process according to claim 1 in which the period of heating to the boiling point of the liquor is from about 30 minutes to about 1 hour, and the period of gentle boiling is from about 15 to about 25 minutes.

3. A process according to claim 1 in which steam is passed through the boiled liquor prior to acid addition.

4. A process according to claim 3 in which the heating and boiling step and the steam step are conducted simultaneously.

No references cited.